Dec. 3, 1968  W. HALCO  3,414,346
STEREOSCOPIC VIEWER
Filed March 20, 1964  5 Sheets-Sheet 1

INVENTOR.
WILLIAM HALCO
BY Knox & Knox

Dec. 3, 1968 W. HALCO 3,414,346
STEREOSCOPIC VIEWER
Filed March 20, 1964 5 Sheets-Sheet 2

INVENTOR.
WILLIAM HALCO
BY
Knox & Knox

Dec. 3, 1968  W. HALCO  3,414,346
STEREOSCOPIC VIEWER
Filed March 20, 1964  5 Sheets-Sheet 3

INVENTOR.
WILLIAM HALCO
BY
Knox & Knox

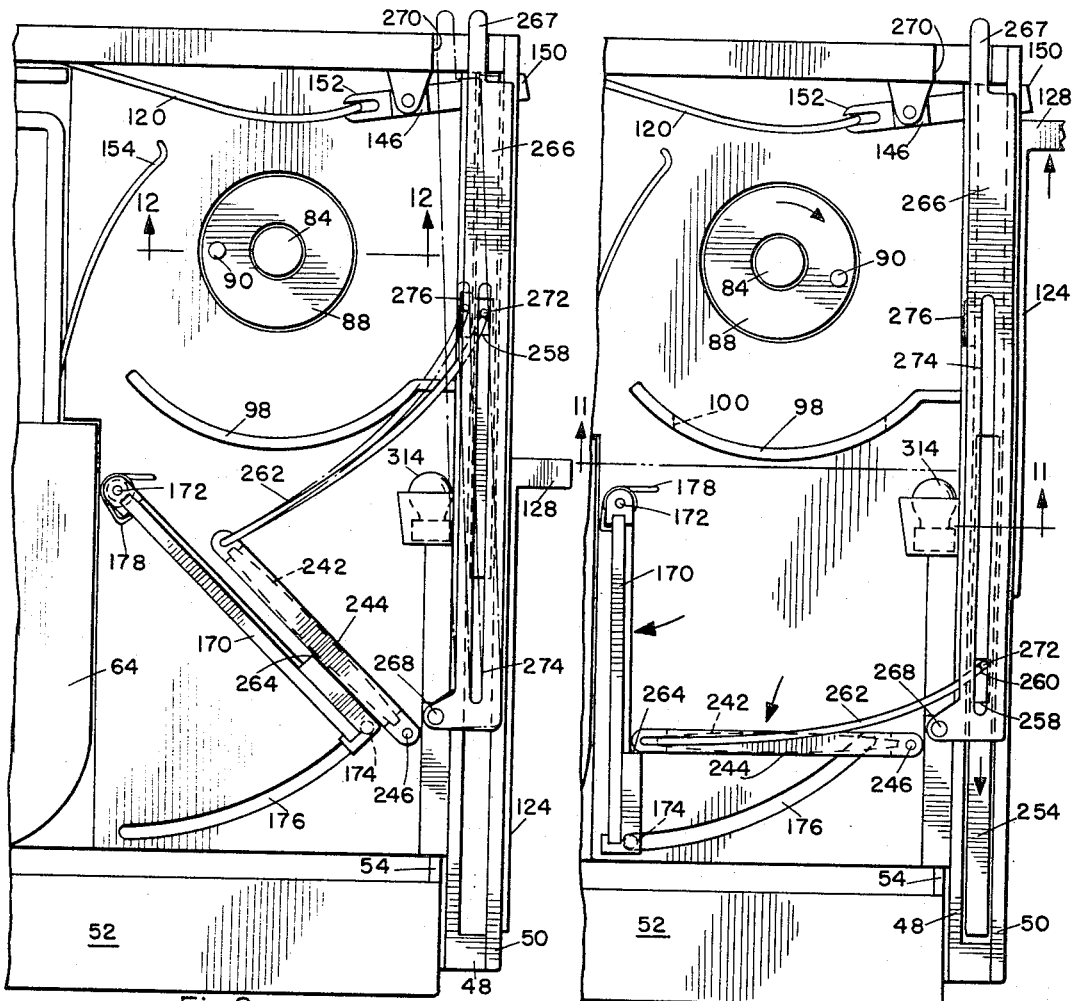

INVENTOR.
WILLIAM HALCO
BY
Knox & Knox

United States Patent Office 3,414,346
Patented Dec. 3, 1968

3,414,346
STEREOSCOPIC VIEWER
William Halco, 8—330 Broadway,
Chula Vista, Calif. 92010
Filed Mar. 20, 1964, Ser. No. 353,347
10 Claims. (Cl. 350—135)

ABSTRACT OF THE DISCLOSURE

The viewer accommodates a stereoscopic film strip as initially processed and without separation and mounting of the stereo pairs, the film strip being interwound with a pull strip which protects the film in addition to carrying titles relating to the subject matter. At each advancement of the film strip the title of the next frame becomes visible to one eye and is separately illuminated within the viewer. Adjustments are provided for focus, interocular separation, differences between the vision of the two eyes and exaggerated stereo effect for extreme close-ups. Film strip advancement is constant to ensure proper framing and the film strip is self-feeding through the viewer at the start.

---

The present invention relates to transparency viewers and specifically to a stereoscopic viewer.

Existing stereoscopic viewers are primarily for use with slides in which stereo transparencies are mounted in pairs. The pairs of images are exposed simultaneously in precise registration on a strip of film in a stereo camera, but must be cut from the film strip and mounted in a slide frame for viewing or projection. Once the frames are cut from the film strip it is difficult to mount them in precise registration and even a minute misalignment can have a serious effect on the true stereoscopic image. Other types of viewers have been made to handle stereo film strips so that image registration is maintained. However, the film strip is handled considerably and is virtually unprotected in use, so that dirt, scratches and abrasions often mar the film after little use. Also, in film strip form there is no simple way to identify the particular frames being viewed, such as individual titles which can be printed on slide frames.

The primary object of this invention, therefore, is to provide a stereoscopic viewer in which a film strip can be viewed exactly as exposed in the camera, without cutting and without the use of mounting frames, the film being completely protected from handling and damage at all times, being carried in an enclosed magazine which is merely dropped into a holder in the viewer and being started and advanced by external controls without the need for threading or other handling.

Another object of this invention is to provide a stereoscopic viewer in which the advancing action from one picture to the next automatically exposes the title of the next picture, directly to one eye, without the necessity for moving the eyes from the normal viewing position.

Another object of this invention is to provide a stereoscopic viewer having means for adjusting the images for focus, interocular separation, extreme close-ups and for differences between the vision of the two eyes, all controls being external and readily accessible.

Still another object of this invention is to provide a stereoscopic viewer in which the advance mechanism has automatic compensation for changes in the length of film advanced at each stroke as the film accumulates on the take-up spool, so maintaining correct framing of the images at all times.

A further object of this invention is to provide a stereoscopic viewer having a foldable handle and battery holder which automatically switches on the internal illumination when opened to the viewing position.

Another object of this invention is to provide a stereoscopic viewer which is compact, fully enclosed and easy to hold in the hands.

In the drawings:

FIGURE 8 is a partial top plan view of the film advance mechanism in picture viewing position;

FIGURE 9 is a view of the same mechanism in title viewing position;

FIGURE 10 is a sectional view taken on line 10—10 of FIGURE 2;

Similar characters of reference indicate similar or identical elements and portions throughout the specification and throughout the views of the drawing.

Film magazine

Figure 1:
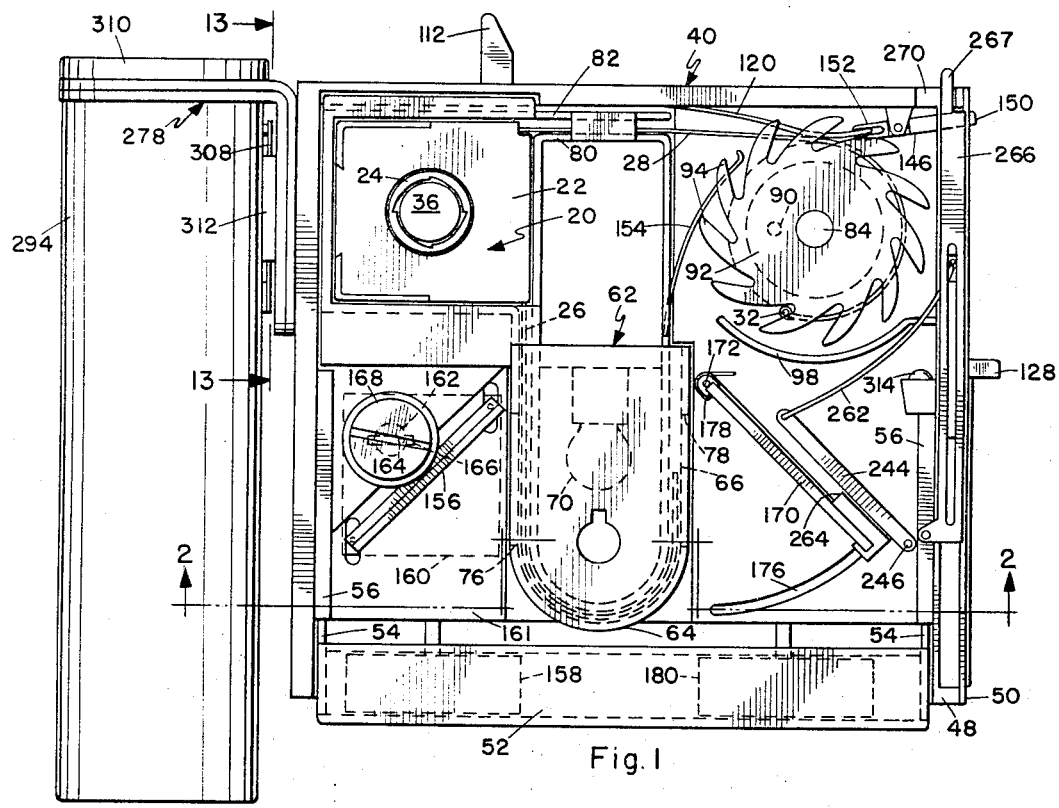
FIGURE 1 is a top plan view of the complete viewer, with the top cover removed.

The viewer is designed primarily for use with a special film magazine as shown and described in my co-pending application for a Film Magazine With Pull Strip, Ser. No. 340,163, filed Jan. 27, 1964, now U.S. Patent No. 3,255,977. With minor modifications other magazines may be used, but the above mentioned magazine is most suitable.

The magazine, indicated at 20, will be described only in sufficient detail to facilitate proper correlation with the mechanism of the viewer. Magazine 20 comprises a generally rectangular casing 22 in which is mounted a freely rotatable spool 24 carrying the film strip 26 wound coextensively with an opaque pull strip 28. The pull strip 28 extends through a slot 30 at one corner of casing 22, the end of the pull strip having a pull bar 32 to engage the viewer mechanism, as hereinafter described. Film strip 26 extends through a slot 34 in another corner of casing 22, normal to the pull strip. Within spool 24 is an axially extendable rewind shaft 36, by which the film and pull strips are rewound after viewing.

Basic structure of viewer

The viewer comprises a generally rectangular casing 40 having a base 42, a left wall 44, a rear wall 46 and a right wall 48, the right wall having an outer cover plate 50. The front of the casing 40 is occupied by an eyepiece holder 52 having parallel support arms 54 at opposite ends, which are slidable in guides 56 on the inside of walls 44 and 48, so that the eyepiece holder is movable into and out of the casing. The casing is enclosed by a top cover 58 which is removable for access to the mechanism, the various screws and similar fastenings for the casing being omitted for simplicity.

Figure 2:
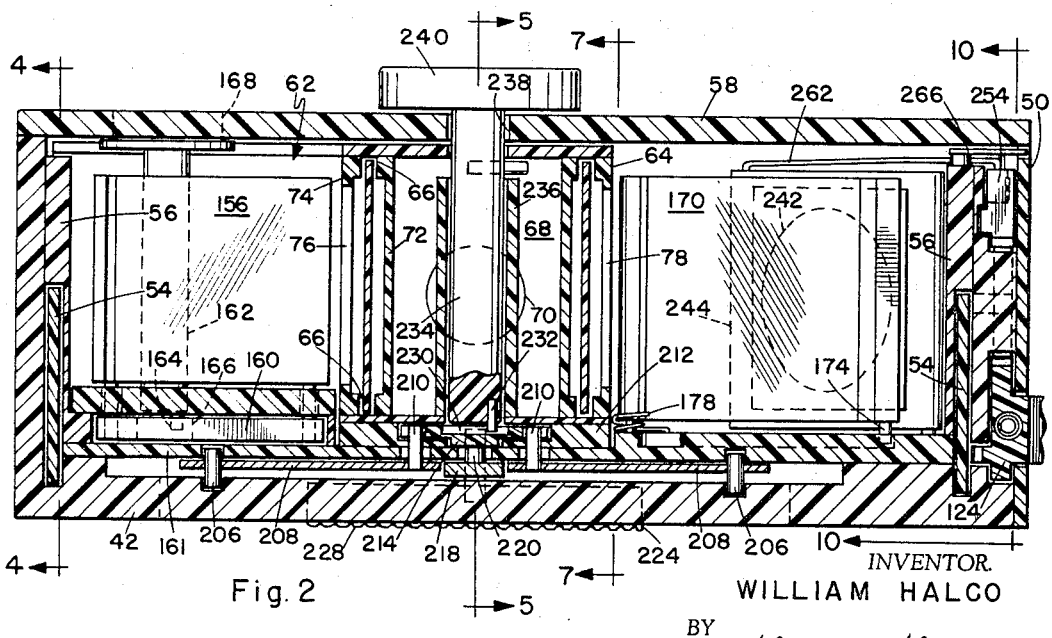
FIGURE 2 is an enlarged sectional view taken on line 2—2 of FIGURE 1.

Inside casing 40 is a film carrier 60 having at the left rear corner an open frame portion comprising a magazine holder 62, into which magazine 20 fits closely, being inserted through an opening 63 in top cover 58. Extending forwardly from the magazine holder 62 is a generally U-shaped guide 64 having upper and lower grooved tracks 66 in which the edges of film strip 26 ride, as in FIGURE 2. Tracks 66 are aligned with one corner of magazine holder 62, so that the film strip 26 will feed from slot 34 of magazine 20 directly into the tracks. Within the U-shaped guide 64 is a lamp housing 68 containing a lamp 70, said lamp housing having a translucent inner wall 72. In the outside opaque wall 74 of guide 64 are a pair of open windows 76 and 78, opposed on opposite sides of the U-shaped portion and spaced so that, when the film strip 26 is extended around the guide, a matching pair of pictures will be framed in said windows and illuminated by lamp 70.

At the rear of the film carrier 60 are spaced guide walls 80 and 82, parallel and adjacent to rear wall 46, between which the pull strip 28 passes. The rewind shaft 36 of magazine 20 can be lifted upwardly or pushed down through an opening 83 in base 42 for operation by either hand.

Figure 3:
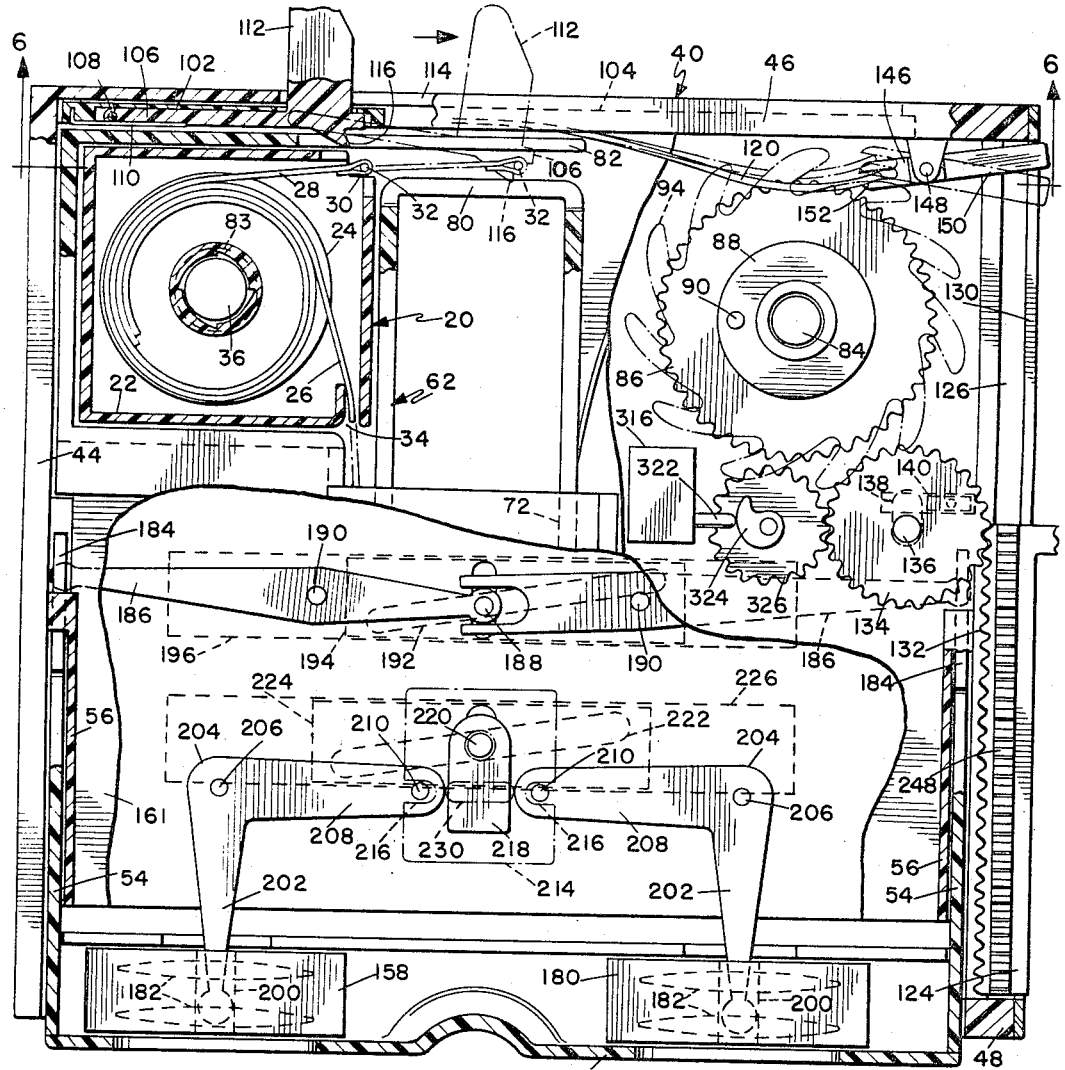
FIGURE 3 is an enlarged top plan view of the viewer with various portions cut away to show the film advance and the focusing mechanisms.
Figure 4:
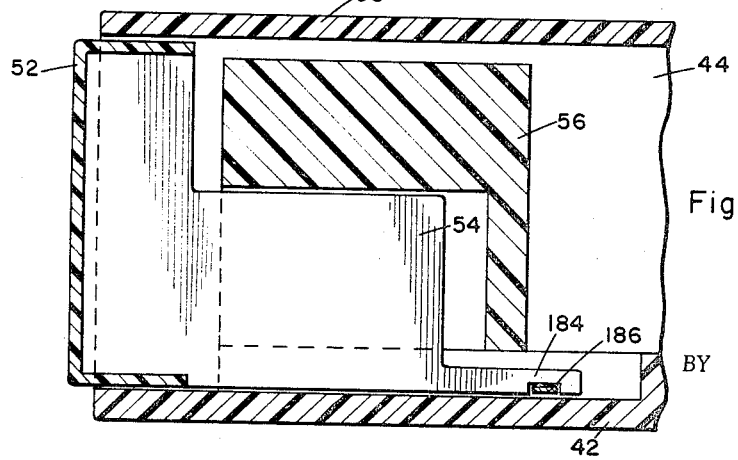
FIGURE 4 is a fragmentary sectional view taken on line 4—4 of FIGURE 2.

In the right rear portion of casing 40 is an upright post 84 fixed in base 42 and on said post is a freely rotatable take-up gear 86 having a raised central hub 88 with a projecting drive pin 90. The hub 88 supports a take-up spool 92 fitting over post 84, said spool having upper and lower radially extending flanges formed into elongated teeth 94 curving in a clockwise direction when viewed from above, as in FIGURES 1 and 3. The lower end of take-up spool 92 has a socket 96 to receive drive pin 90, so that said spool rotates with gear 86. Extending arcuately around the forward portion of take-up spool 92 is a title frame 98 having an opening 100.

*Film handling mechanism*

In the rear wall 46 is a slide block 102 laterally slidable in a channel 104 and having inset therein a catch plate 106 pivoted at one end on a hinge pin 108. Catch plate 106 is biased to a position flush within slide block 102 by a spring 110. At the free end of catch plate 106 is a knob 112 extending outwardly through a slot 114 in rear wall 46, and an inwardly projecting pick-up hook 116. When knob 112 is pressed to move to the right, as indicated in broken line in FIGURE 3, the motion causes catch plate 106 to swing inwardly, so that pick-up hook 116 engages the pull bar 32 and pull strip 28 is extracted from the magazine 20. Guide wall 82 has a lateral slot 118 to allow catch plate 106 to pass through and extend the pull strip 28 to the vicinity of take-up spool 92 in a complete stroke. A follow-up spring 120 attached to rear wall 46 engages pull strip 28 and urges the pull bar 32 inwardly to be hooked over a pair of upper and lower teeth 94 of take-up spool 92. Slide block 102 is returned to its starting position by a suitable return spring 122 when knob 112 is released.

Figure 11:
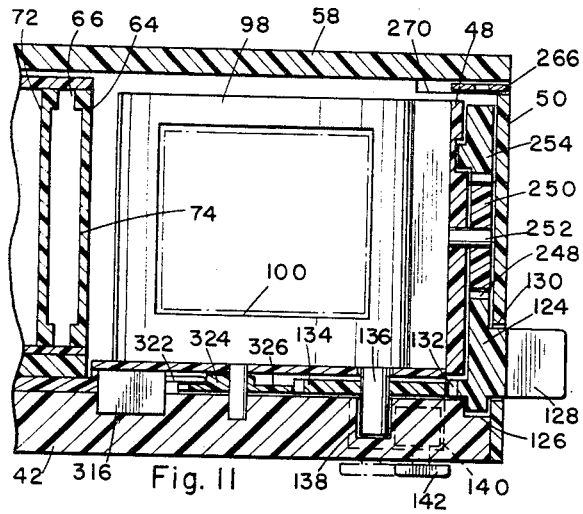
FIGURE 11 is a sectional view taken on line 11—11 of FIGURE 9.
Figure 12:
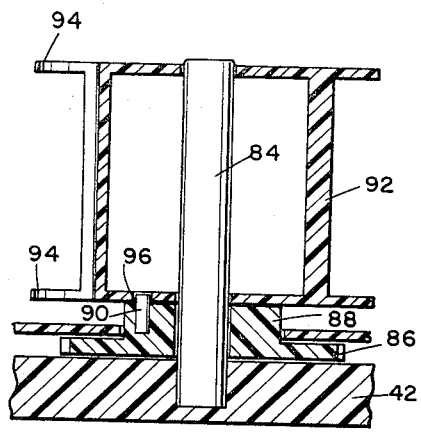
FIGURE 12 is a fragmentary sectional view taken on line 12—12 of FIGURE 8.

In the right wall 48 is mounted an advance bar 124 slidable from front to rear in a channel 126, said advance bar having a knob 128 projecting outwardly through a slot 130 in cover plate 50. On the inside of advance bar 124 is a toothed rack 132 engaging a drive gear 134 mounted on a shaft 136 which has limited sliding motion in a slot 138 in base 42 elongated in a direction parallel to the motion of the advance bar. Thus as advance bar 124 is pushed to the rear, the drive gear 134 slides into engagement with take-up gear 86 and causes rotation of take-up spool 92. For reasons hereinafter described, the drive gear 134 can be held against sliding motion by a stop 140 inset in base 42 and being movable by an external knob 142 to obstruct slot 138, as in FIGURES 3 and 11. Advance bar 124 is returned to the forward position by a return spring 144.

Mounted on the rear wall 46 adjacent right wall 48 is a compensator 146, pivotal about a vertical axis on a hinge 148 and having a stop bar 150 projecting outwardly through channel 126 to be engaged by the advance bar 124 at the rear end of its stroke. Compensator 146 has a grooved arm 152 on the inner side in which follow-up spring 120 is retained. When take-up spool 92 is empty, the stop bar 150 rests against the rear end of channel 126, as indicated in full line in FIGURE 3. As the film and pull strip are wound up on the take-up spool, follow-up spring 120 is forced to the rear, causing stop bar 150 to swing forward, as indicated in broken line, so decreasing the stroke of advance bar 124. This arrangement compensates for the increasing effective circumference of take-up spool 92 as the layers of film and pull strip build up and ensures that the actual length of film advanced at each stroke is constant and the pictures are always properly framed in windows 76 and 78.

In the position illustrated in FIGURE 1, the pull strip 28 is engaged on take-up spool 92 and the advance bar 124 has been operated once to start winding the pull strip on the spool. The film strip 26 has advanced around guide 64 and successive strokes of advance bar 124 will extend the end of film strip 26 from the guide toward take-up spool 92, the film strip being urged toward the spool by a guide bar 154. The film strip is wound on take-up spool 92 between layers of the pull strip 28 and is thus fully protected at all times while in use.

*Ocular accommodation or optical system*

At the side of window 76 is an upright mirror 156 set at 45 degrees to the plane of said window to direct light therefrom forwardly to a left eyepiece 158 mounted in eyepiece holder 52. Mirror 156 is supported on a block 160 which is slidable from front to rear on a cap plate 161 secured over base 42 and is controlled by an adjustment rod 162 having an eccentric pin 164 riding in a slot 166 in said block. The adjustment rod 162 extends upwardly to a head 168 inset in top cover 58 for external adjustment.

At the side of window 78 is an upright mirror 170 supported by a vertical hinge pin 172 at the rear edge, the forward edge having a guide pin 174 which rides in an arcuate track 176 in cap plate 161. The track 176 limits the swing of mirror 170 from a position alongside film guide 64 covering window 78 to another position at 45 degrees to the plane of said window. A spring 178 around hinge pin 176 biases mirror 170 to the 45 degree position, from where light is reflected from window 78 forwardly to a right eyepiece 180 in eyepiece holder 52. The eyepieces 158 and 180 comprise conventional lenses 182 mounted in suitable frames which are laterally slidable in eyepiece holder 52.

The arms 54 of eyepiece holder 52 have extensions 184, which are connected to the ends of a pair of focusing arms 186 coupled to a common central actuating pin 188 and pivoted intermediate their ends on hinge pins 190. Actuating pin 188 rides in a diagonal slot 192 in a focusing knob 194, which is laterally slidable in a channel 196 in base 42, and has a serrated grip portion 198 projecting slightly below the base for manual operation. Lateral motion of focusing knob 194 causes arms 186 to swing and slide the eyepiece holder 52 in or out of casing 40.

Eyepieces 158 and 180 have slots 200 in the lower portions thereof, in which are inserted the arms 202 of a pair of bellcranks 204 pivotally mounted on base 42 by hinge pins 206, the other arms 208 of said bellcranks extending inwardly and having actuating pins 210 thereon projecting upwardly through cap plate 161. Film guide 64 has a base plate 212 in which is mounted a coupler 214 slidable from front to rear, said coupler having opposed notches 216 in which actuating pins 210 are retained, as in FIGURES 2 and 3. Between the ends of arms 208 is a slide block 218 having a coupling pin 220 which projects downwardly into a diagonal slot 222 in an adjustment knob 224, laterally slidable in a channel 226 in base 42. Adjustment knob 224 extends below base 42 and has a serrated grip portion 228. Coupling pin 220 also projects upwardly through cap plate 161 and fits into slide block 218.

In the top of coupler 214 is a laterally elongated slot 230 in which is seated an eccentric pin 232 on a fine adjustment rod 234, which is rotatable in a sleeve 236 extending upwardly through lamp housing 68. Rod 234 passes through top cover 58 in a slot 238 elongated from front to rear and is fitted with a knob 240.

Figure 5:
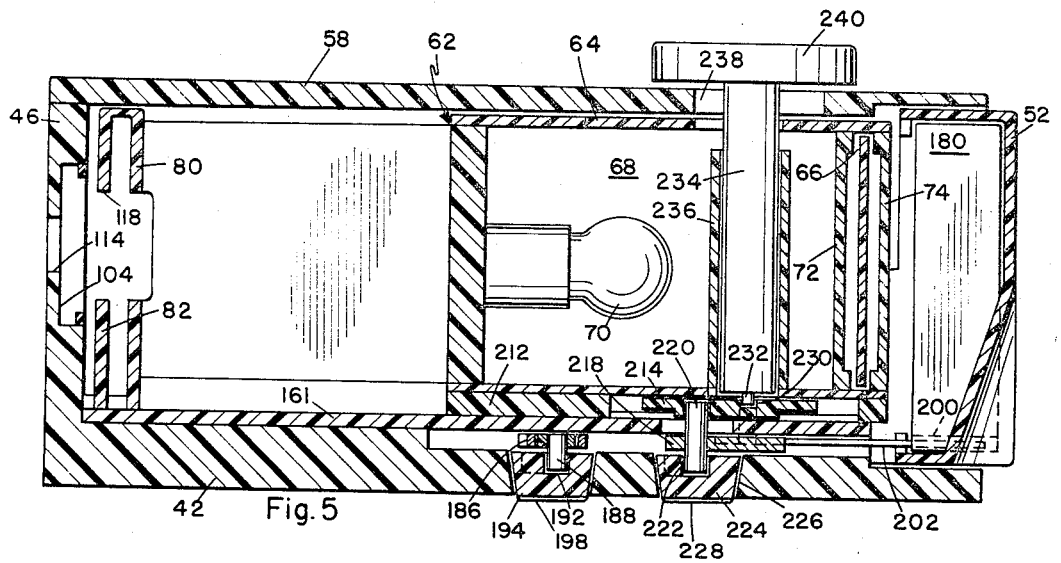
FIGURE 5 is a sectional view taken on line 5—5 of FIGURE 2.
Figure 6:
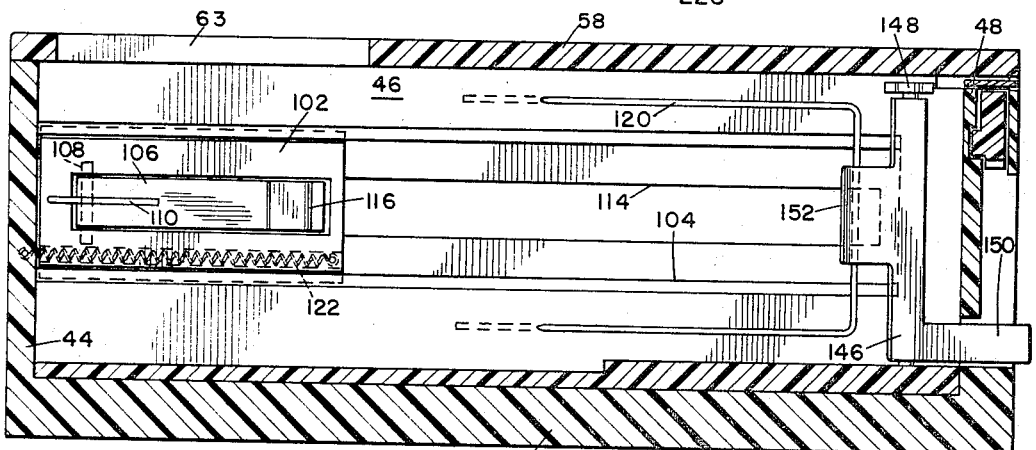
FIGURE 6 is a sectional view taken on line 6—6 of FIGURE 3.
Figure 7:
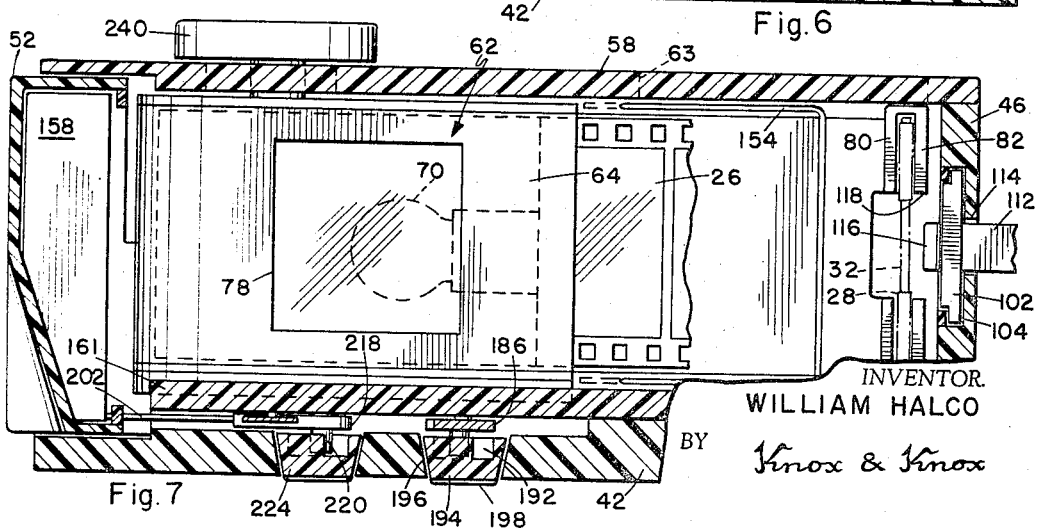
FIGURE 7 is a sectional view taken on line 7—7 of FIGURE 2.

When adjustment knob 224 is moved laterally, the coupler 214 moves from front to rear and swings bell-cranks 204, causing eyepieces 158 and 180 to be moved laterally for adjustment of inter-ocular separation. Since the coupler 214 is also connected to the film carrier 60 through eccentric pin 232 and fine adjustment rod 234, as will be evident in FIGURE 5, the entire film carrier will slide from front to rear relative to mirrors 156 and 170. This ensures that although the lateral separation of eyepieces 158 and 180 may change, the effective optical paths from the lenses to windows 76 and 78 will remain constant and correct focus will be maintained. It should be noted that the entire film carrier 60 merely rests on cap plate 161 and is held in place only by top cover 58. The actual motion involved is quite small, the adjustment being made to suit the interocular separation of individuals, which is quite critical in proper stereoscopic viewing.

With coupler 214 held in place by adjustment knob 224, rotation of the fine adjustment rod 234 moves the film carrier 60 independently of the eyepieces. This provides fine focus adjustment to compensate for individual vision defects, or to adjust the optical paths to suit a particular pair of stereo pictures which may have an exaggerated stereo effect, as in an extreme close-up. In addition, rotation of adjustment rod 162 provides adjustment of mirror 156 independently to compensate for differences in vision between the two eyes of an individual.

Title viewer system

Behind mirror 170 is an auxiliarly lens 242 in a frame 244 which is pivotally mounted at its outer end on a vertical hinge pin 246 adjacent wall 48. Advance bar 124 has a toothed rack 248 along its upper edge, which engages a transfer gear 250 rotatably mounted on a shaft 252 substantially at the center of wall 48. Above gear 250 is a toothed actuating bar 354 slidable in a channel 256 and engaging said gear, so that when advance bar 124 is pushed to the rear, the actuating bar slides forward, as will be apparent in FIGURE 10. In the top of actuating bar 254 is a socket 258 in which is held the folded end 260 of a tie rod 262, the other end of which is pivotally attached to the free end of lens frame 244. When actuating bar 254 is at the rearmost position, lens frame 244 is behind and substantially parallel to mirror 170, as in FIGURE 8. As advance bar 124 slides to the rear during advancement of the film strip, actuating bar moves forward and causes lens frame 244 to swing forward, the inner end of said frame sliding along the rear of mirror 170 and causing the mirror to swing inwardly against the slide of film guide 64, as in FIGURE 9. A stop 264 is provided on the back of mirror 170 to limit the travel and ensure that lens 242 is properly aligned to bring the title frame 98 into focus for the right eye. When advance bar 124 is released, the lens 242 will be swung back and spring 178 will return mirror 170 to its diagonal position.

If the pull strip 28 is not titled, or titles are not required, the auxiliary lens 242 can be disconnected from the advance mechanism by means of a lock-out bar 266 which lies along the top of wall 48 and is pivotally attached thereto at its forward end by a hinge 268. The rear end of lock-out bar 266 has a knob portion 267 projecting through a notch 270 in rear wall 46. The folded end 260 of tie rod 262 has an upwardly projecting tip 272 which rides in a longitudinal slot 274 in lock-out bar 266. When it is desired to disconnect lens 242, the lock-out bar is shifted inwardly, displacing folded end 260 from socket 258 into a retaining socket 276 in the wall 48, as indicated in the broken line position in FIGURE 8.

Electrical system

Figure 15:
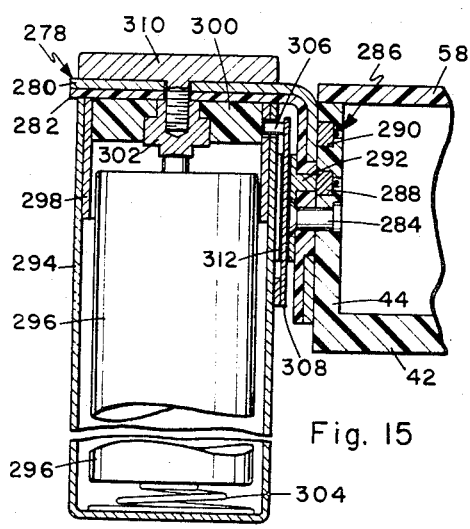
FIGURE 15 is a sectional view taken on line 15—15 of FIGURE 14.

Mounted on the rear portion of left wall 44 is a right angled bracket 278 having a conductive outer portion 280 and an insulated inner portion 282, the bracket being held by a hinge pin 284 through said wall, as in FIGURE 15. The hinge incorporates a switch 286 comprising a pair of terminals 288 and 290 in wall 44, a contact 292 through insulated portion 282 which connects with terminal 288, and the conductive portion 280 which maintains contact with terminal 290.

Secured to bracket 278 is a hollow cylindrical handle 294 which serves as a container for batteries 296. In the upper end of handle 294 is a sleeve 298 with an insulated end plug 300 fixed therein, the end plug having a central terminal 302 which contacts the positive terminal of one battery. The other side of the circuit is completed through the usual battery retaining spring 304 to the handle 294 itself. Sleeve 298 is held in place by a locking pin 306 fixed to a locking spring 308 conductively secured to handle 294, the handle being attached to bracket 278 by a screw 310 threaded into central terminal 302, which connects that terminal to the conductive portion 280. With handle 294 in place, the locking spring 308 is held in a connecting channel 312 connected to contact 292.

Figure 13:
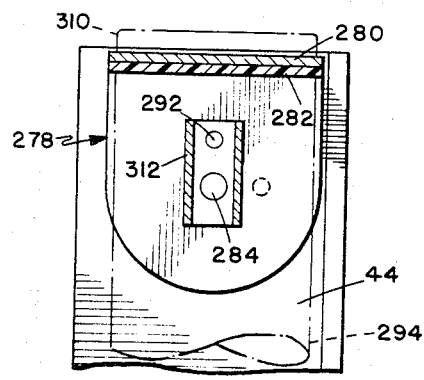
FIGURE 13 is a fragmentary sectional view taken on line 13—13 of FIGURE 1 with the handle in stored position.
Figure 14:
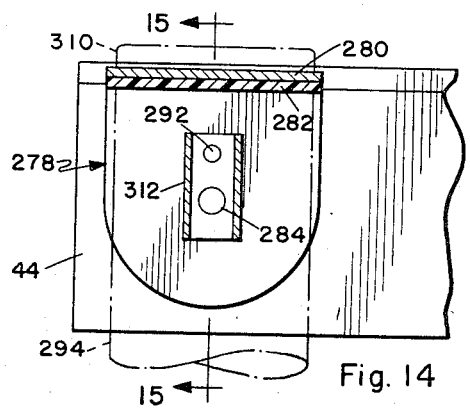
FIGURE 14 is a sectional view showing the handle in viewing position.

With handle 294 folded along wall 44, contact 292 and terminal 288 are separated, as in FIGURE 13. When handle 294 is swung down to operating position, as in FIGURE 14, contact 292 and terminal 288 are brought together to complete the circuit and energize lamp 70.

Figure 16:
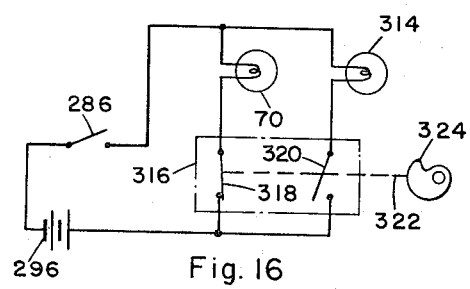
FIGURE 16 is a wiring diagram of the viewer.

A separate lamp 314 is used to illuminate the title frame 98 and both lamps are controlled by a dual switch 316 having a normally closed switch 318 and a normally open switch 320. Switch 316 has an actuating plunger 322 which is operated by a cam 324 on a cam gear 326 driven by drive gear 134 each time the film strip is advanced. Other means may be used for operating the switches if desired. Switch 318 leaves lamp 70 on for viewing, while lamp 314 is turned off by switch 320, as in the wiring diagram of FIGURE 16, the switch 286 being closed when handle 294 is turned to operating position. When advance bar 124 is operated the cam gear 326 is turned and causes switch 318 to open and switch 320 to close. Lamp 70 is turned off so that the left eye will not see the film strip in motion, lamp 314 remaining on to illuminate the title frame as long as advance bar 124 is held in the rear position. In the title viewing position the mirror 170 covers window 78 and prevents light from lamp 314 from passing through to window 76 and dimly illuminating the frame for the left eye. When the advance bar is released, cam gear 326 reverses, turning off lamp 314 and re-energizing lamp 70 to illuminate the next picture. The switch arrangement operates even when the title viewing mechanism is disconnected, so that the eyes are not distracted by the moving film strip during advancement. Also, with stop 140 engaged to prevent film advance, lamp 314 can be turned on to review a particular title by operating the advance bar.

Operating features

The film magazine 20 is merely dropped into the holder 62, no threading being necessary. A single stroke of knob 112 feeds the pull strip 28 to the take-up spool 92 and starts the film strip 26 around the guide 64. One or two strokes of advance bar 124 will then bring the first frames of the film strip into windows 76 and 78. Handle 294 is turned to the operating position and the first picture can be viewed. If the picture pair is not exactly centered in the windows, the film strip can be slightly advanced by a partial stroke of advance bar 124, or retarded by means of the rewind shaft 36. The compensator 146 will ensure that subsequent pictures are properly framed without further adjustment. When all pictures have been viewed, the film strip and pull strip are rewound and the magazine is removed, without the film being handled, so avoiding fingerprints, scratches and other damage.

The eyepiece holder is adjustable for initial focus, the eyepieces being adjustable for inter-ocular separation. In addition, the optics can be adjusted to suit an individual's vision, to compensate for vision defects, or to focus an exaggerated stereo view properly.

Titles can be viewed at any time, with or without film advancement, or title viewing can be omitted. The picture illumination is always turned off as the film strip is advanced to avoid the sight of moving images.

It is understood that minor variation from the form of the invention disclosed herein may be made without departure from the spirit and scope of the invention, and that the specification and drawings are to be considered as merely illustrative rather than limiting.

I claim:

1. A stereoscopic viewer comprising:
   a casing;
   a film carrier in said casing having a film strip holder at the rear thereof and a substantially U-shaped film strip guide extending forwardly from said holder, said film carrier being mounted for limited forward and backward motion in the casing;
   said guide having windows spaced to display a matching pair of stereo frames on the film strip;
   illumination means behind said windows;
   a take-up spool mounted in the rear of said casing opposed to said holder;
   pick-up means to engage and transfer the starting end of a film strip from said holder, through said guide, to said take-up spool;
   advance means coupled to said take-up spool to rotate the spool and wind the film strip thereon;
   an eyepiece holder in the forward portion of said casing and having a pair of eyepieces laterally movable therein;
   mirrors adjacent said windows inclined to direct images of the windows forwardly to said eyepieces;
   means to adjust one of said mirrors independently substantially along the optical path of its associated eyepiece;
   and focusing means coupled to said eyepieces and said film carrier to vary the inter-ocular separation of the eyepieces while simultaneously moving the film carrier to maintain substantially constant length focal paths from said windows to the respective eyepieces.

2. A stereoscopic viewer for use with a film magazine having a film strip and a pull strip coextensively wound therein, with spaced outlets for the film strip and pull strip, the viewer comprising:
   a casing;
   a film carrier in said casing having a magazine holder and a film strip guide extending from said holder;
   said magazine holder being disposed to hold a magazine with the film strip outlet adjacent said guide;
   said guide having windows spaced to display a matching pair of stereo frames on the film strip;
   illumination means behind said windows;
   a take-up spool mounted in said casing opposed to said magazine holder;
   pick-up means mounted adjacent said magazine holder to engage and transfer the starting end of the pull strip from a magazine to said take-up spool, whereby the film strip is simultaneously fed into said guide;
   guide means to guide the film strip from said guide to said take-up spool;
   advance means coupled to said take-up spool to rotate the spool and wind the pull strip and film strip coextensively thereon;
   an eyepiece holder in the forward portion of said casing and having a pair of eyepieces laterally movable therein;
   mirrors adjacent said windows inclined to direct images of the windows forwardly to said eyepieces;
   said film carrier being mounted for limited forward and backward motion in said casing;
   and focusing means coupled to said eyepieces and said film carrier to vary the inter-ocular separation of the eyepieces while simultaneously moving the film carrier to maintain substantially constant length focal paths from said windows to the respective eyepieces.

3. A stereoscopic viewer for use with a film magazine having a film strip and a pull strip coextensively wound therein with spaced outlets for the film strip and pull strip, the viewer comprising:
   a casing;
   a magazine holder in said casing;
   a take-up spool in said casing and spaced from said holder;
   a film guide between said holder and said take-up spool and having a pair of windows spaced to display a matching pair of frames on the film strip;
   advance means coupled to said take-up spool and said holder to wind the pull strip thereon, while simultaneously advancing the film strip through said film guide;
   additional guide means from said film guide to said take-up spools to guide the film strip into inter-winding engagement with the pull strip on the spool;
   and an ocular accommodation system having focusing and interocular adjusting means and including reflecting means and a pair of eyepieces in said casing disposed for viewing said windows, with said film and in optical alignment one through each eyepiece.

4. A stereoscopic viewer according to claim 1 and including compensating means coupled to said take-up spool and being engaged by said advance means to vary the motion of the advance means in proportion to the length of film strip wound on said take-up spool.

5. A stereoscopic viewer according to claim 2 and including fine focusing means coupled to said film carrier to move the film carrier independently of said eyepieces.

6. A stereoscopic viewer according to claim 2 and including a title frame adjacent said take-up spool to frame a portion of the pull strip wound thereon;
   one of said mirrors being hinged to swing aside and expose said title frame to the associated eyepiece when the film strip is advanced.

7. A stereoscopic viewer according to claim 6 wherein said one mirror is operatively coupled to said advance means; and
   lock-out means to disengage said one mirror selectively from said advance means.

8. A stereoscopic viewer according to claim 2 and including a title frame adjacent said take-up spool to frame a portion of the pull strip wound thereon;
   one of said mirrors being hinged and coupled to said advance means to swing aside and expose said title frame to the associated eyepiece when the film strip is advanced;
   and an auxiliary lens coupled to said one mirror to be interposed between the said associated eyepiece and said title frame when said one mirror is swung aside.

9. A stereoscopic viewer according to claim 3 and including title viewing means coupled to said advance means so as to expose a portion of the pull strip to one of said eyepieces when the film strip is advanced.

10. A stereoscopic viewer according to claim 9, wherein said title viewing means comprises a mirror interposed between said one eyepiece and the associated window and being coupled to said advance means to move between a first position exposing the window and obstructing the pull strip and a second position obstructing the window and exposing the pull strip;

and title illuminating means actuated by said advance means when said mirror is moved to said second position.

References Cited

UNITED STATES PATENTS

| | | | |
|---|---|---|---|
| 1,452,660 | 4/1923 | Sherman | 282—16 |
| 1,481,519 | 1/1924 | MacDonald | 282—16 |
| 2,380,088 | 7/1945 | Tickell | 350—135 |
| 2,709,401 | 5/1955 | Jaros | 350—137 X |
| 2,712,773 | 7/1955 | Merrick | 350—139 |
| 2,758,505 | 8/1956 | Perlin | 350—137 |
| 2,817,269 | 12/1957 | Filmer | 350—135 |

DAVID SCHONBERG, *Primary Examiner.*

P. R. GILLIAM, *Assistant Examiner.*